(12) United States Patent
Ford

(10) Patent No.: US 7,051,060 B2
(45) Date of Patent: May 23, 2006

(54) OPERAND CONVERSION OPTIMIZATION

(75) Inventor: Richard L. Ford, Clinton, MA (US)

(73) Assignee: Intel Corporation, Santa Clara, CA (US)

(*) Notice: Subject to any disclaimer, the term of this patent is extended or adjusted under 35 U.S.C. 154(b) by 532 days.

(21) Appl. No.: 09/966,701

(22) Filed: Sep. 28, 2001

(65) Prior Publication Data

US 2003/0065698 A1 Apr. 3, 2003

(51) Int. Cl.
*G06F 5/00* (2006.01)

(52) U.S. Cl. .................................... 708/495

(58) Field of Classification Search ........... 708/490, 708/495
See application file for complete search history.

(56) References Cited

U.S. PATENT DOCUMENTS 6,317,824 B1 * 11/2001 Thakkar et al. ............ 712/222
6,327,604 B1 * 12/2001 Steele, Jr. .................. 708/495
2002/0095451 A1 * 7/2002 Krygowski et al .......... 708/495
2002/0184282 A1 * 12/2002 Yuval et al .................. 708/495

* cited by examiner

*Primary Examiner*—D. H. Malzahn
(74) *Attorney, Agent, or Firm*—Blakely, Sokoloff, Taylor & Zafman LLP

(57) ABSTRACT

According to the invention, optimization of an application by elimination of redundant operand conversions is disclosed. According to one embodiment, the optimization comprises receiving an application that includes one or more operations, with one or more operands of the operations being converted from a first format to a second format before performing an operation; determining the origin of the one or more operands that are converted from the first format to the second format; and if the origin of any of the one or more operands that are converted from the first format to a second format is a conversion from the second format to the first format, then eliminating the redundant conversion from the second format to the first format and from the first format to the second format.

26 Claims, 9 Drawing Sheets

Optimization of Floating Point Emulation

```
FLO_type
sub (FLO_type arg_a, FLO_type arg_b)
{
    fp_number_type a;
    fp_number_type b;
    fp_number_type tmp;
    fp_number_type *res;
    FLO_union_type au, bu;

au.value = arg_a;
    bu.value = arg_b;

unpack_d (&au, &a);      ← 320
    unpack_d (&bu, &b);
    b.sign ^= 1;             ← 330
    res = _fpadd_parts (&a, &b, &tmp);   ← 335
    return pack_d (res);     ← 345
}
```

Figure 3B

Conventional Subtraction Routine

```
FLO_type
add (FLO_type arg_a, FLO_type arg_b)
{
    fp_number_type a;
    fp_number_type b;
    fp_number_type tmp;
    fp_number_type *res;
    FLO_union_type au, bu;

au.value = arg_a;
    bu.value = arg_b;

unpack_d (&au, &a);      ← 315
    unpack_d (&bu, &b);
    res = _fpadd_parts (&a, &b, &tmp);   ← 325
    return pack_d (res);     ← 340
}
```

Figure 3A

Conventional Addition Routine

| | |
|---|---|
| 405 | $T = a \times b \times c$ |
| 410 | $T_0 = a \times b$ |
| 415 | $T_1 = T_0 \times c$ |
| 420 | $T_2 = unpack(a)$ |
| 425 | $T_3 = unpack(b)$ |
| 430 | $T_4 = unpack\_mult(T_2, T_3)$ |
| 435 | $T_0 = pack(T_4)$ |
| 440 | $T_5 = unpack(T_0)$ |
| 445 | $T_6 = unpack(c)$ |
| 450 | $T_7 = unpack\_mult(T_5, T_6)$ |
| 455 | $T_1 = pack(T_7)$ |

Figure 4   Calculation Using Conventional Floating Point Emulation

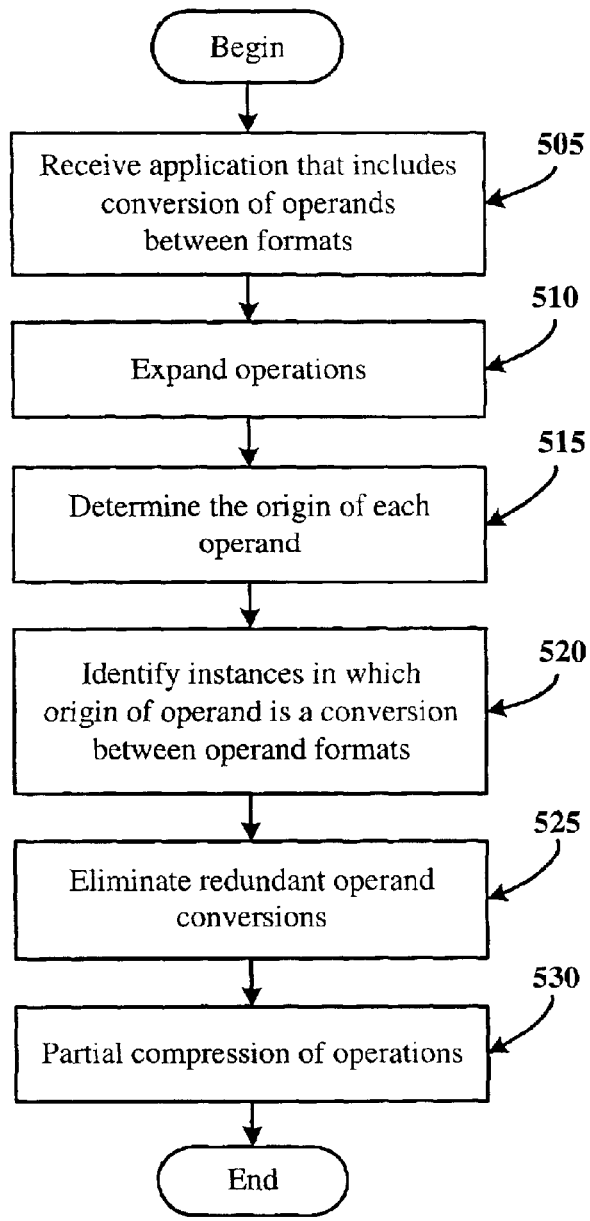
Figure 5    Operand Conversion Optimization

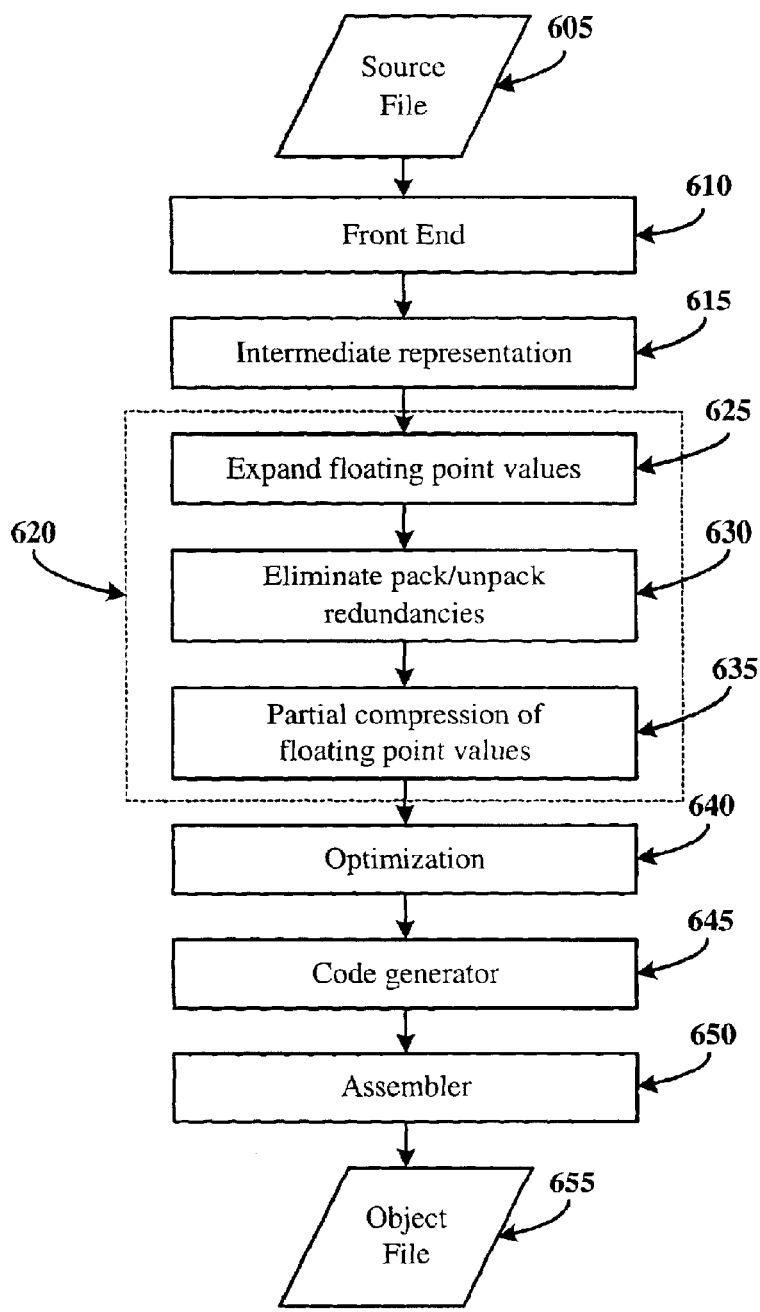
Figure 6 — Exemplary System Including Operand Conversion Optimization

Optimization of Floating Point Emulation

| | |
|---|---|
| 805 | $T = a \times b \times c$ |
| 810 | $T_0 = a \times b$ |
| 815 | $T_1 = T_0 \times c$ |
| 820 | $T_2 = unpack(a)$ |
| 825 | $T_3 = unpack(b)$ |
| 830 | $T_4 = unpack\_mult(T_2, T_3)$ |
| 835 | $T_5 = unpack(c)$ |
| 840 | $T_6 = unpack\_mult(T_4, T_5)$ |
| 845 | $T_1 = pack(T_6)$ |

Figure 8  Calculation Using Emulation Optimization

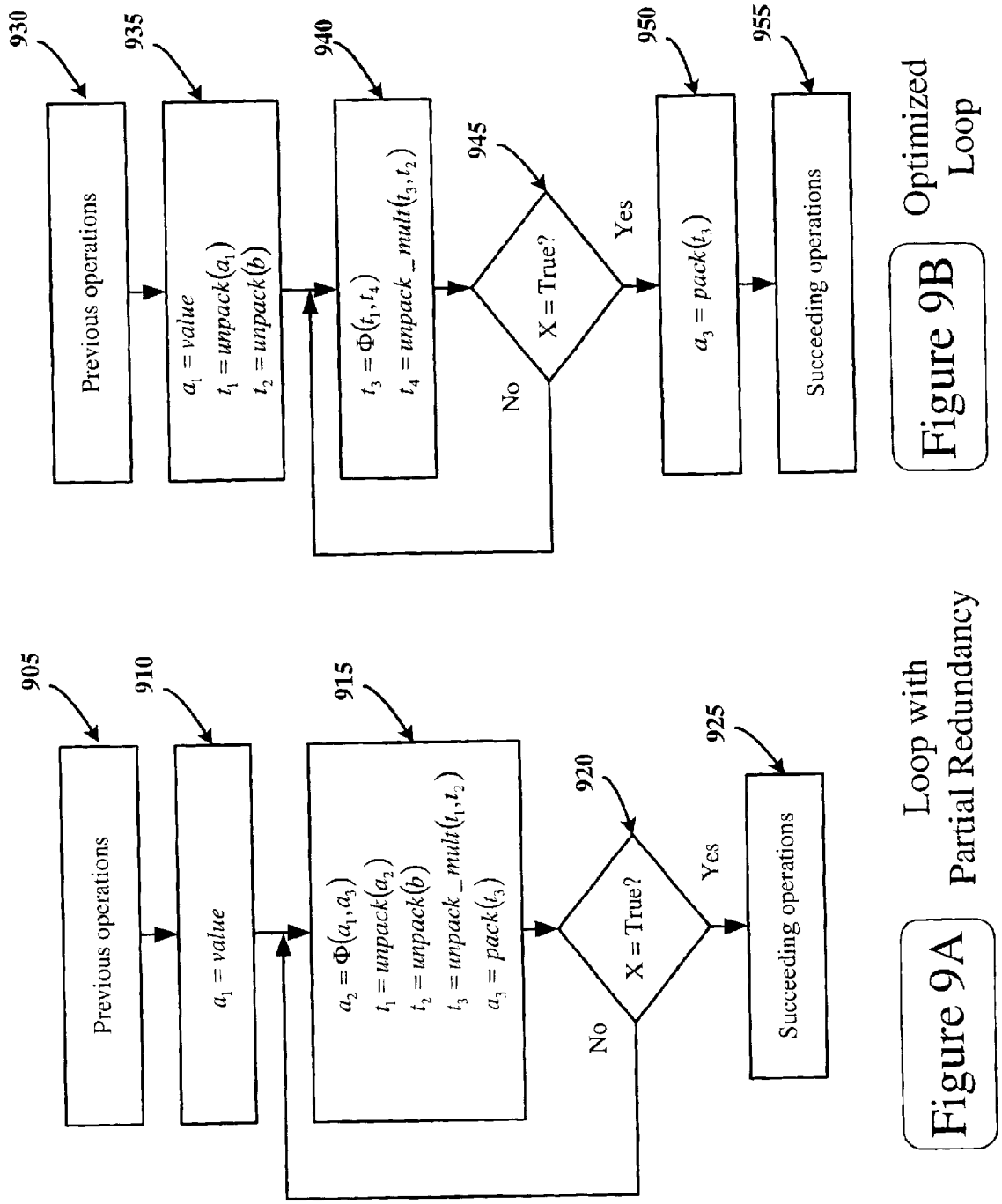

OPERAND CONVERSION OPTIMIZATION

COPYRIGHT NOTICE

Contained herein is material that is subject to copyright protection. The copyright owner has no objection to the facsimile reproduction by anyone of the patent document or the patent disclosure, as it appears in the United States Patent and Trademark Office patent file or records, but otherwise reserves all rights to the copyright whatsoever. The following notice applies to the software and data as described below and in the drawings hereto: Copyright © 2001, Intel Corporation, All Rights Reserved.

FIELD OF THE INVENTION

This invention relates to computers in general, and more specifically to optimization of applications by the elimination of redundant operand conversions.

BACKGROUND OF THE INVENTION

In computer operations, operands may require conversion between different formats. For example, an operand may be stored in one format but certain operations may be conducted in another format. A specific example of operand conversions regards floating point calculations. In certain computing devices, because of considerations such as size, power, and expected usage, a floating point logic unit for the execution of floating point mathematical functions is not included. If floating point operations are needed, the calculations may be done by software emulation of floating point operations.

However, conversions of operands between formats will generally slow system operations. Software emulation of floating point operations are executed relatively slowly. The device for which software emulation is applied, because it lacks floating point hardware, cannot effectively conduct mathematical operations on floating point operands while the operands are in floating point form. For this reason, a conventional software emulation of a floating point operation results in converting each operand into another format that is more easily operated upon. A standard floating point number is stored in a relatively small format, and is said to be in a "packed" format. A number in a "packed" floating point format may be converted to an "unpacked" format that can be effectively used in calculations.

In conventional operand conversions, the operand is converted from a first format to a second format for the purposes of an operation and then is converted back to the original format after the operation. In floating point emulation, operands are generally stored in packed format, are converted into unpacked format for the execution of floating point calculations, and then the result of the function is packed again after the calculation.

The process of packing and unpacking numbers for floating point operations, while allowing for more efficient mathematical operations in a computing environment in which a floating point logic unit is absent, also can take significant time and thus impose performance costs. As calculations become more complex, there may be results of operations that are packed after the operations performed, and then that are subsequently unpacked again if the results are operands for additional operations. The format conversions may create unnecessary delays because of the redundant transformations of operands between the packed and unpacked formats.

BRIEF DESCRIPTION OF THE DRAWINGS

The appended claims set forth the features of the invention with particularity. The invention, together with its advantages, may be best understood from the following detailed descriptions taken in conjunction with the accompanying drawings, of which:

FIG. 3A is a conventional addition routine for floating point emulation;

FIG. 3B is a conventional subtraction routine for floating point emulation;

FIG. 4 illustrates the expansion and computation of an exemplary floating point equation under conventional floating point emulation;

FIG. 5 is a block diagram illustrating an embodiment of operand conversion optimization;

FIG. 6 is a block diagram of an embodiment of a exemplary compilation system including operand conversion optimization;

FIG. 8 illustrates the expansion, optimization, and computation of a exemplary floating point equation;

FIG. 9A is a diagram of an exemplary loop containing a partial redundancy; and

FIG. 9B is a diagram of an optimized loop in which the partial redundancy has been eliminated.

DETAILED DESCRIPTION

Figure 1:
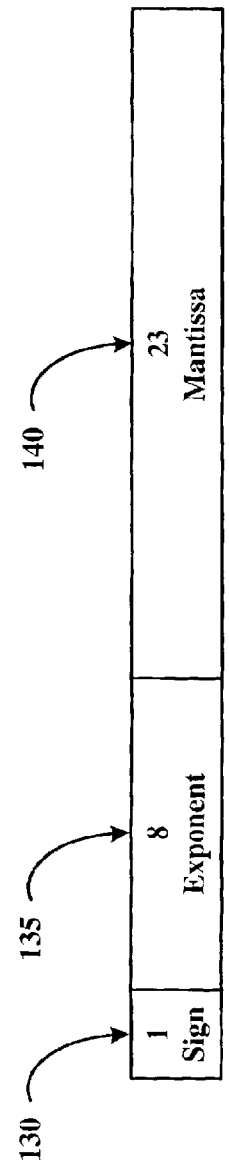
FIG. 1A illustrates the structure of floating point numbers under IEEE Standard 754.
FIG. 1B illustrates the storage of a single precision floating point number under IEEE Standard 754.

A method and apparatus are described for optimization by the elimination of redundant operand conversions. In an embodiment, a series of functions is examined to determine whether redundant sequences converting operands between a plurality of formats exist. The redundant sequences are eliminated to optimize the operation of the functions.

In the following description, for the purposes of explanation, numerous specific details are set forth in order to provide a thorough understanding of the present invention. However, it will be apparent to one skilled in the art that the present invention may be practiced without some of these specific details. In other instances, well-known structures and devices are shown in block diagram form.

The present invention includes various processes, which will be described below. The processes of the present invention may be performed by hardware components or may be embodied in machine-executable instructions, which may be used to cause a general-purpose or special-purpose processor or logic circuits programmed with the instructions to perform the processes. Alternatively, the processes may be performed by a combination of hardware and software.

Terminology

Before describing an exemplary environment in which various embodiments of the present invention may be implemented, some terms that will be used throughout this application will briefly be defined:

As used herein, "packed" indicates that a number is stored in a floating point format, including but not limited to the single precision and double precision floating point formats pursuant to Standard 754 of the Institute of Electrical and Electronic Engineers, *IEEE Standard for Binary Floating-Point Arithmetic*, IEEE Computer Society, published Aug. 12, 1985.

"Unpacked" indicates that a floating point number is stored in converted format. A floating point number may be converted to an unpacked format to enable floating point mathematical operations in a computing environment in which a floating point logic unit is not present. While the examples provided herein provide for an "expanded" format in which a floating point number requires greater storage than in packed format, embodiments are possible in which the size of the storage is not increased.

An operand is a "floating point" number when the operand is expressed as a mantissa multiplied by a radix, where the radix is raised to the power of an exponent. A general form of a floating point number expressed in mathematical terms is:

$$m \times r^e \quad [1]$$

where m=mantissa, r=radix, e=exponent

Under an embodiment, an application includes a series of operations. In order to perform a first operation, one or more operands of the first operation are converted from a first format to a second format. After the first operation is performed, the result is converted back from the second format to the first format. However, the result of the first operation may be an operand for a second operation. In conventional functions, the result of the first operation is again converted from the first format to the second format in order to perform the second operation. The conversion of the result from the second format to the first format after the performance of the first operation followed by conversion from the first format to the second format before the performance of the second operation thus creates a redundant sequence of conversions.

Under an embodiment, the operations included within an application are examined and the origin of each operand converted from a first format to a second is determined. If the origin of an operand is a conversion from the second format to the first format, then the redundant series of conversions is eliminated to optimize the performance of the application. Note that while the embodiment described relates to conversions between a first format and a second format, other embodiments might involve conversions between more than two formats, including conversions to and from intermediate formats. After redundant conversions have been eliminated, code may be partially compressed to save required code storage space sequence, which may be possible when certain operations do not have redundant conversion sequences to eliminate.

In a particular embodiment, an application includes software emulation of floating point operations. In a computing environment in which there is no floating point logic unit, it is generally more efficient to perform mathematical functions using fixed point numbers. In a software emulation of a floating point operation, floating point numbers are generally converted to fixed point format prior to performing the operation, with the result of the operation then converted from fixed point format back to floating point format. If the result of a first floating point operation is an operand of a second floating point operation, the number is then converted back to fixed point format prior to the performance of the second operation.

According to an embodiment, an application including floating point operations is expanded. The expansion of the application includes the conversion of floating point operands from a packed format into an unpacked format prior to performing floating point operations, and then the conversion of operation results from the unpacked format to the packed format subsequent to the performance of the operations. The operations of the application are examined to determine the origin of any operand that is converted from packed to unpacked format. If the origin of such an operand is a previous conversion of the number from the unpacked format to the packed format, the redundant pack-unpack conversion sequence can be eliminated to optimize the operation of the application.

In one embodiment, floating point numbers are expressed in packed form as IEEE Standard 754 floating point numbers. While embodiments are not limited to a particular standard for floating point representation, IEEE Standard 754 format is most commonly used for floating point format and is used herein for the purposes of illustration. IEEE floating point numbers are comprised of a sign, an exponent, and a mantissa and may be expressed either as single precision (32 bit) or double precision (64 bit) numbers. In general cases, a floating point number according to IEEE Standard 754 may be expressed as:

$$-1^S \times (1 \cdot m) \times 2^{(e-b)} \quad [2]$$

where: S is a sign bit equal to 0 for positive and 1 for negative;

e is an exponent value with 8 bits for single precision and 11 bits for double precision;

b is the bias, a number subtracted from the stored exponent to obtain the actual exponent, equal to 127 for single precision and 1023 for double precision; and m is the portion of the mantissa after the decimal point, with 23 bits for single precision and 52 bits for double precision.

FIG. 1A illustrates the structure of single and double precision floating point numbers according to IEEE Standard 754. Floating point numbers are distinguished by the precision 105 of a number, with single precision numbers being stored in 32 bits and double precision numbers being stored in 64 bits. The sign 110 of a number is stored in a single bit, either bit 31 for single precision numbers or bit 63 for double precision numbers. The exponent 115 is stored in bits 30–23 (8 bits) for single precision numbers or bits 62–52 (11 bits) for double precision numbers. The mantissa 120 is stored in bits 22–0 (23 bits) for single precision numbers or bits 51–0 (52 bits) for double precision numbers. The bias 125, as indicated above, is 127 for single precision numbers and 1023 for double precision numbers. FIG. 1B provides a diagram of a single precision number under IEEE Standard 754, with 1 bit reserved for the sign 130, 8 bits reserved for the exponent 135, and 23 bits reserved for the mantissa 140. There are special cases for the storage of certain numbers such as zero and infinity that are not described here.

Figure 2:
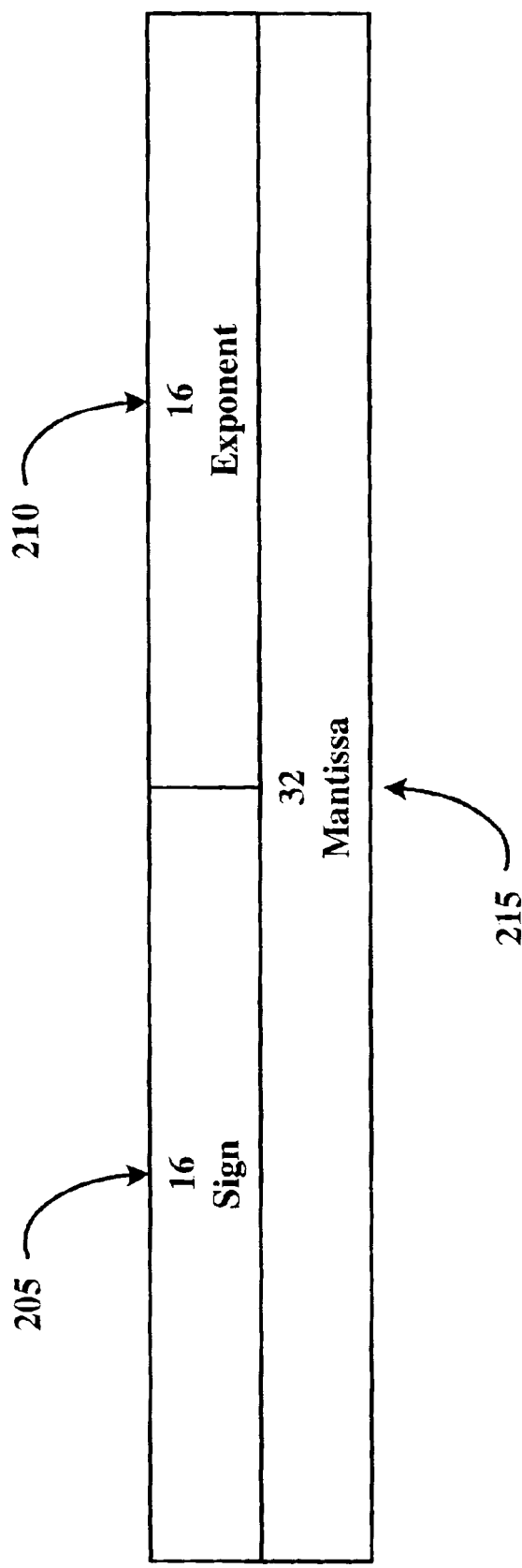
FIG. 2 illustrates an unpacked floating point number under a particular embodiment.

FIG. 2 is an illustration of an unpacked floating point number under a particular embodiment. In this embodiment, the floating point number is expanded into a short integer (16 bits) for the sign 205, a short integer for the exponent 210, and a long integer (32 bits) for the mantissa 215. A variant of this illustration is a mantissa that is signed, thereby eliminating the need for a variable containing the sign of the unpacked number. This is an example of a converted numerical format that may be used under a particular embodiment, but other embodiments may use other numerical formats.

A conventional floating point addition routine 305 is shown in FIG. 3A and a conventional floating point subtraction routine 310 is shown in FIG. 3B. The routines shown in FIGS. 3A and 3B are part of a software floating point library created by the Free Software Foundation, Inc. of Boston, Mass., copyright © 1994, 1995, 1996, 1997, and 1998. In the routines, floating point operands are unpacked prior to performing the operation, 315 and 320. In the floating point addition routine 305 the unpacked operands are added and a result designated as "res" is obtained 325. In the floating point subtraction routine 310, the sign of the second operand is first inverted 330 and then the unpacked operands are added and a result designated as res is obtained 335. In both routines the unpacked result res is packed and returned as the result of the function, 340 and 345. Other conventional software emulation routines, such as floating point multiplication and floating point division, operate in a similar manner.

In FIG. 4, a basic example of calculation utilizing conventional emulation of floating point mathematics is shown in pseudocode. Note that the example provided in FIG. 4 and examples provided elsewhere herein are written assuming a static single assignment (SSA) naming format, in which there are distinct names for each value of a variable. For example, if a calculation includes a definition of X=1 followed by X=X+1, the two "X" variables receive distinct names in the system. For the purposes of this explanation, the same equations may instead be referred to as $X_0$=1 followed by $X_1$=$X_0$+1. Other name assignment formats may be utilized in other embodiments.

In FIG. 4, the basic equation T=a×b×c 405 multiplying three operands is resolved as a multiplication of two operands to obtain a first result followed by the multiplication of the first result times the third operand. This may be expressed as $T_0$=a×b 410 and $T_1$=$T_0$×c 415. These basic expressions are then expanded into the commands required to evaluate the expressions. The first two operands are unpacked, $T_2$=unpack (a) 420 and $T_3$=unpack (b) 425, and the unpacked operands are multiplied together, $T_4$=unpack_mult($T_2$, $T_3$) 430. The result is then packed into floating point format, $T_0$=pack($T_4$) 435. To complete the second half of the equation, for $T_1$=$T_0$×c 415, the two operands are expanded, $T_5$=unpack($T_0$) 440 and $T_6$=unpack(c) 445. The expanded operands are then multiplied together, $T_7$=unpack_mult($T_5$,$T_6$)450, and finally the product is packed into floating point format, $T_1$=pack($T_7$) 455. However, it can be seen that $T_0$=pack($T_4$) 435 and $T_5$=unpack($T_0$) 440 are unnecessary steps in that the result is packed after completion of the multiplication of $T_5$ and $T_6$, followed by unpacking again to multiply the result times the third operand. The packing and unpacking of the number thus are redundant processes in conventional floating point multiplication.

FIG. 5 is a block diagram illustrating a general embodiment of operand conversion optimization. In this embodiment, an application is received that includes the conversion of operands between formats, process block 505. This may be a conversion of an operand from a first format to a second format before performing an operation and a conversion of the result of the operation from the second format to the first format after the performance of the operation. If necessary, the application is expanded into basic operations, process block 510. An example of the expansion of an application into basic operations is the expansion of a complex equation into the basic mathematical functions required to calculate the equation, including any conversions of operands from the first format to the second format and any conversions of results from the second format to the first format. Each operand that requires conversion from the first format to the second format prior to performance of an operation is examined and the origin of each such operand is determined, process block 515. Any instances in which the origin of an operand is a conversion from the second format to the first format are identified, process block 520. In these instances, there is a redundancy because the origin of the operand is the conversion of the number from the second format to the first format, which would occur if the operand was the result of a previous operation, and then the number is converted back to the second format before an operation is performed. The redundant operand conversions are then eliminated, process block 525, which allows the application to run without performing the wasted steps. After optimization, partial compression of the operations, process block 530, may reduce code storage size.

FIG. 6 illustrates an embodiment of the optimization of floating point conversions in the context of compiling a source file to obtain an object file. A source file, process block 605, is initially presented to the front end of the compilation process, process block 610, to parse the commands of the source code. The source file is converted into an intermediate representation, process block 615, in which the code is represented with float operations in standard compressed representation without optimization. At this point, operand conversion redundancies may exist in the code. Following the conversion of the code into an intermediate representation is the conversion optimization sequence, 620, comprising of expanding floating point values, process block 625, in which floating point numbers are expressed in unpacked format; eliminating any pack/unpack redundancies that are discovered, process block 630, to optimize the operation of the code; and partial compression of floating point values, process block 635, in which the resulting code is partially returned to compressed format to reduce code size. In the partial compression of floating point values, process block 635, certain floating point operations have no conversion redundancies to optimize and thus can be compressed into the original compressed format. The resulting code may then subjected to further optimizing, process block 640, and the optimized code is processed by a code generator, process block 645, to generate the assembly language code for the application and an assembler, process block 650, to generate the machine language code for the resulting object file, process block 655.

Figure 7:
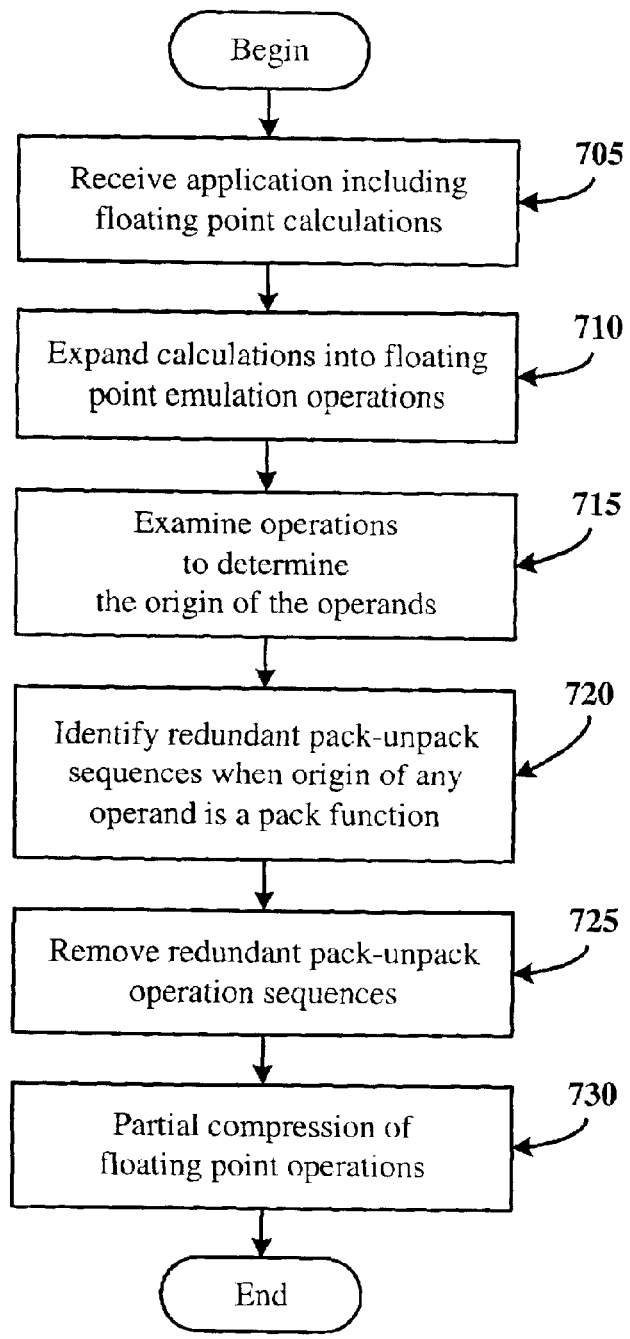
FIG. 7 is a block diagram illustrating an embodiment of optimization of floating point emulation.

In FIG. 7, an embodiment of optimization of floating point emulation is illustrated. In the embodiment, an application including floating point calculations is received, process block 705, and the calculations are expanded into floating point emulation operations, process block 710. The operations are examined to determine the origin of the operands, process block 715. Redundant pack-unpack sequences are identified when the origin of any operand is a pack function, process block 720. As indicated above, a redundant pack-unpack sequence is a sequence in which a number is packed and then is subsequently unpacked for use in another operation. Redundancies are removed from the emulation operations, process block 725, and operations are partially compressed, process block 725, with compression possible when certain operations do not contain pack-unpack redundancies that can be eliminated.

FIG. 8 is an illustration of an emulation of a floating point operation in which a redundant pack-unpack sequence has been eliminated. In this example, the basic equation T=a×b×c 805, as used in FIG. 4, is again expanded. The equation may be expressed as $T_0$=a×b 810 and $T_1$=$T_0$×c 815. The multiplication of the first two operands is performed by unpacking the floating point numbers, $T_2$=unpack(a) 820 and $T_3$=unpack(b) 825, and multiplying the unpacked operands, $T_4$=unpack_mult($T_2$,$T_3$) 830. In order to multiply the product of $T_2$ and $T_3$, designated as $T_4$, with the third operand c, it is only necessary to unpack c, $T_5$=unpack(c) 835, since $T_4$ remains in unpacked format. The operation is thus completed by generating the product of the unpacked multiplication, $T_6$=unpack_mult($T_4$,$T_5$) 840, and packing the result into floating point format, $T_1$=pack($T_6$) 845. In this example, the removal of the redundant pack-unpack sequence eliminates two process steps from the expression shown in FIG. 4.

A special case regarding operand conversion optimization occurs in situations of partial redundancy. In partial redundancy, there is a redundant conversion in a first case, but not in a second case. An example of partial redundancy occurs in a loop that uses one or more results from a loop cycle as operands for operations in a subsequent loop cycle. In this case, operand conversion may be redundant if the loop is repeated but may not be redundant if the loop is not repeated. It is known that invariants may be converted outside a loop instead of inside the loop to improve operations, but variables that change in value by operation of a loop are different in operation.

FIG. 9A illustrates a loop containing a partial redundancy. In this particular example, floating point format conversions for software emulation of floating point operations are shown, but other types of variable conversions could exist in other embodiments. In this example, a loop contains the equation a=a·b , which in static single assignment form may be expressed $a_2$=Φ($a_1$, $a_3$) followed by $a_3$=$a_2$·b, where $a_1$ is the value of a prior to the execution of the loop. In this psuedocode expression, the Φ-function chooses the appropriate value based on the control path used to reach the expression. In this case, $a_1$ is chosen in the initial loop and $a_3$ is chosen in subsequent loops. After some possible previous operations 905, $a_1$ is set at a value 910. A loop 915 contains the expanded form of the loop equation, including the required unpacking of the operands prior to multiplication and the subsequent packing after the multiplication operation. Following the loop 915, there is a decision 920 to determine whether a statement is true. If the statement is not true, loop 915 is repeated. If the statement is true, the application path exits loop 915 and continues with other succeeding operations 925. The operation $a_3$=pack($t_3$) at the conclusion of the loop will form a redundant sequence with $t_1$=unpack($a_2$) in a case in which the loop is repeated but not in a case in which the path exits the loop, thereby forming a partial redundancy.

FIG. 9B illustrates a loop in which the partial redundancy shown in FIG. 9A has been eliminated to optimize the operation. In this instance, following the previous operations and setting $a_1$ to a value, $a_1$ and b are unpacked 935, with b being unpacked to move this invariant operation out of the loop and $a_1$ being unpacked to address the partial redundancy. Within the loop 940, the operations are now performed in unpacked form with no packing or unpacking. If the following decision condition 945 is false, the loop continues without the redundancy. If the decision condition 945 is true, then $a_3$ is packed outside of the loop 950, followed by any succeeding operations 955. In this way, the packing operation is eliminated when it comprises part of a redundant pack-unpack sequence but is performed when there is no redundancy.

The degree to which a floating point operation may be optimized by the elimination of redundant pack-unpack sequences is dependent on the actual functions and operands that are generated. The examples provided herein are purposely simple to express the basic concepts involved, but considerably more complex calculations may be optimized under various embodiments. Such examples may include a large number of floating point operations, floating point operations that are mixed with other types of operations, operations performed in multiple loops or as a part of iterative solutions, and other complicating factors.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method comprising:
   expanding an application into a series of operations, the series of operations including a first operation and a second operation;
   examining the series of operations to determine that:
      a result of the first operation is an operand of the second operation, and
      the series of operations includes a first conversion of the result of the first operation from a first format to a second format after the first operation and a second conversion of the operand of the second operation from the second format to the first format prior to the second operation; and
   eliminating the first conversion and the second conversion from the series of operations.

2. The method of claim 1, further comprising partially compressing the series of operations after the elimination of the first conversion and the second conversion.

3. The method of claim 1, further comprising determining that the series of operations includes a third conversion of a result from the second format to the first format that is immediately followed by a fourth conversion of an operand from the first format to the second format in a first case and that is not immediately followed by the fourth conversion in a second case.

4. The method of claim 3, wherein the third conversion and the fourth conversion occur within a loop, and further comprising moving the third conversion and the fourth conversion from inside the loop to outside the loop.

5. The method of claim 1, wherein the first format is a unpacked floating point format and the second format is an packed floating point format.

6. A method comprising:
   receiving an application, the application including one or more floating point calculations;
   expanding the application, the expansion of the application comprising expanding the floating point calculations into a series of floating point operations on floating point operands, the floating point operations including a conversion of an operand of a floating point operation from a packed format to an unpacked format prior to the performance of the floating point operation and converting the result of a floating point operation from the unpacked format to the packed format after the performance of the floating point operation;
   determining that a result of a first floating point operation of the series of floating point operation is an operand of a second floating point operation of the series of floating point operations; and
   eliminating the conversion of the result of the first floating operation from the unpacked format to the packed format and the conversion of the operand of the second floating point operation from the packed format to the unpacked format.

7. The method of claim 6, wherein the packed format is a standard floating point format.

8. The method of claim 7, wherein the standard floating point format is in accordance with Standard 754 of the Institute of Electrical and Electronic Engineers.

9. The method of claim 6, wherein the unpacked format is an operand format that may be used in performing floating point emulation of a floating point operation.

10. The method of claim 9, wherein a conversion of a floating point operand from the packed format to the unpacked format comprises a conversion of the floating point operand to one or more integer values.

11. The method of claim 6, further comprising partially compressing the remaining floating point operations, if any, after the elimination of the conversions.

12. The method of claim 6, further comprising determining that the series of floating point operations includes a third conversion of a result from the second format to the first format that is immediately followed by a fourth conversion of an operand from the first format to the second format in a first case and that is not immediately followed by the fourth conversion in a second case.

13. The method of claim 12, wherein the first conversion and the fourth conversion are within a loop, and the sequences of instructions include instructions that, when executed by a processor, cause the processor to perform operations comprising moving one or more operand conversions from inside the loop to outside the loop.

14. A machine-readable medium having stored thereon data representing sequences of instructions that, when executed by a processor, cause the processor to perform operations comprising:
  expanding an application into a series of operations, the series of operations including a first operation and a second operation;
  examining the series of operations to determine that:
    a result of the first operation is an operand of the second operation, and
    the series of operations includes a first conversion of the result of the first operation from a first format to a second format after the first operation and a second conversion of the operand of the second operation from the second format to the first format prior to the second operation; and
  eliminating the first conversion and the second conversion from the series of operations.

15. The medium of claim 14, wherein the sequences of instructions include instructions that, when executed by a processor, cause the processor to perform operations comprising partially compressing the series of operations after the elimination of the first conversion and the second conversion.

16. The medium of claim 14, wherein the sequences of instructions include instructions that, when executed by a processor, cause the processor to perform operations comprising determining that the series of operations includes a third conversion of a result from the second format to the first format that is immediately followed by a fourth conversion of an operand from the first format to the second format in a first case and that is not immediately followed by the fourth conversion in a second case.

17. The medium of claim 16, wherein the third conversion and the fourth conversion are within a loop, and wherein the sequences of instructions include instructions that, when executed by a processor, cause the processor to perform operations comprising instructions for moving the third and fourth conversions from inside the loop to outside the loop.

18. The medium of claim 14, wherein the first format is a unpacked floating point format and the second format is an packed floating point format.

19. A machine-readable medium having stored thereon data representing sequences of instructions that, when executed by a processor, cause the processor to perform operations comprising:
  receiving an application, the application including one or more floating point calculations;
  expanding the application, the expansion of the application comprising expanding the floating point calculations into a series of floating point operations on floating point operands, the floating point operations including a conversion of an operand of a floating point operation from a packed format to an unpacked format prior to the performance of the floating point operation and converting the result of a floating point operation from the unpacked format to the packed format after the performance of the floating point operation;
  determining that a result of a first floating point operation of the series of floating point operation is an operand of a second floating point operation of the series of floating point operations; and
  eliminating the conversion of the result of the first floating operation from the unpacked format to the packed format and the conversion of the operand of the second floating point operation from the packed format to the unpacked format.

20. The medium of claim 19, wherein the packed format is a standard floating point format.

21. The medium of claim 20, wherein the standard floating point format is in accordance with Standard 754 of the Institute of Electrical and Electronic Engineers.

22. The medium of claim 19, wherein the unpacked format is an operand format that may be used in performing floating point emulation of a floating point operation.

23. The medium of claim 22, wherein a conversion of a floating point operand from the packed format to the unpacked format comprises a conversion of the floating point operand to one or more integer values.

24. The medium of claim 19, wherein the sequences of instructions include instructions that, when executed by a processor, cause the processor to perform operations comprising partially compressing the remaining floating point operations, if any, after the elimination of the conversions.

25. The medium of claim 19, wherein the series of instructions further comprises instructions for determining that the series of floating point operations includes a third conversion of a result from the second format to the first format that is immediately followed by a fourth conversion of an operand from the first format to the second format in a first case and that is not immediately followed by the fourth conversion in a second case.

26. The medium of claim 25, wherein the third conversion and the fourth conversion are within a loop, and wherein the sequences of instructions include instructions that, when executed by a processor, cause the processor to perform operations comprising moving the third and fourth conversions from inside the loop to outside the loop.

* * * * *